United States Patent [19]

Shubow

[11] Patent Number: 4,826,534
[45] Date of Patent: May 2, 1989

[54] METALLIZING COMPOSITIONS, METAL BONDED STRUCTURES AND METHODS OF METALLIZING AND/OR FIREPROOFING

[76] Inventor: Calvin Shubow, 30205 Summit Dr., Farmington Hills, Mich. 48018

[21] Appl. No.: 111,352

[22] Filed: Oct. 22, 1987

[51] Int. Cl.$^4$ .............................................. C09D 5/18
[52] U.S. Cl. ................................. 106/18.11; 252/601
[58] Field of Search ............... 106/18.11, 18.14, 18.26, 106/18.31; 252/601; 501/118

[56] References Cited

U.S. PATENT DOCUMENTS

| | | | |
|---|---|---|---|
| 2,610,420 | 9/1948 | Hopkinson | 106/18.26 |
| 3,585,135 | 6/1971 | Smith et al. | 106/18.11 |
| 3,923,534 | 12/1975 | Cassidy | 106/85 |
| 4,166,743 | 9/1979 | Wortmam et al. | 106/18.31 |
| 4,262,055 | 4/1981 | Russell et al. | 106/85 |
| 4,305,976 | 12/1981 | Zubiate et al. | 106/18.11 |
| 4,419,133 | 12/1983 | Shubow et al. | 501/118 |
| 4,503,109 | 3/1985 | Shubow et al. | 106/85 |
| 4,588,510 | 5/1986 | Salyer et al. | 106/18.11 |

Primary Examiner—Paul Lieberman
Assistant Examiner—Willie J. Thompson
Attorney, Agent, or Firm—Krass & Young

[57] ABSTRACT

Particulate compositions are provided for exothermic reaction with acidic phosphate binder for layered application as a high early strength fast set heat-swelling fire-intumescable fireproofing barrier or fire wall cover for the surface of a substrate structure such as panels, walls, warehouse and storage spaces, heating and processing zones and the like. The invention also concerns metallizing compositions and technology for use in the decorative arts, in the building industry, and in the manufacture of metal or ceramic articles and structures. In particular, the invention concerns technology employing compositions containing metal powder, ceramic acicular or fibrous metal, and magnesium oxide for reacting with acidic phosphate binder solution to form any of a variety of rigid shaped forms such as ornamental coatings, cathodic members or electroconductive elements, tool and die structures for forming plastic and metal parts, metal conglomerate or monolithic shapes with or without a substrate; and the like.

10 Claims, 3 Drawing Sheets

METALLIZING COMPOSITIONS, METAL BONDED STRUCTURES AND METHODS OF METALLIZING AND/OR FIREPROOFING

TECHNICAL FIELD

This invention concerns metal particulate compositions and technology for use in the decorative arts, in the building industry, in the manufacture of metal articles and structures, and in fireproofing substrate structures such as building walls, panels and the like. In particular, the invention concerns technology employing high early strength curable magnesium oxide/acidic phosphate binder mixtures containing certain particulates especially metal particulates that can be applied to and bonded on a substrate surface in a variety of forms such as structural or ornamental coatings, thermal barriers, cathodic members or electroconductive elements, monolithic forms, and the like.

BACKGROUND ART

Aluminophosphate binders for various aggregates are known. Hacker, U.S. Pat. No. 4,303,450, discloses compositions for fireproofing steel structural members, which compositions comprise cement, perlite aggregate and bentonite; the dry composition is mixed with water in a nozzle mixer and sprayed onto the steel surface.

Shubow, U.S. Pat. Nos. 4,419,133 and 4,503,109, discloses bonded aggregate structures comprising alumina, magnesia, an aggregate such as sand or stone, and bonding agent comprising MAP also known as MALP (monoaluminum phosphate, $Al(H_2PO_4)_3$).

Cassidy, U.S. Pat. No. 3,923,534, discloses slow setting castable compositions comprising magnesia, MAP and a refractory filler, and may also contain plasticizers when the composition is to be used as a ramming or gunning mix, e.g. bentonite and other clays or substitutes therefor, and clays may also be present to increase the hot strength of the product; foaming agents may also be present.

Russell, U.S. Pat. No. 4,262,055, discloses ammonium phosphate binders with a magnesia curing agent for light weight aggregates such as perlite. The aggregate binder mixture is applied as a light weight fire protection material to a structural member. Such mixtures have the drawback that the reaction between the ammonium phosphate and magnesia releases gaseous ammonia, which is unpleasant and hazardous for the workers.

Limes, U.S. Pat. No. 3,285,578, discloses refractory compositions comprising ammonium phosphate binders with magnesia, curing agent and aggregates which may be raw dolomite; the compositions may be in the form of gunning mixes.

Cassens, U.S. Pat. No. 4,276,091, describes refractory compositions containing alkali metal phosphate and aluminum salt binders for refractory aggregates. The compositions of Cassens is mixed dry and water is added to the dry mix in the nozzle of the gun prior to application to a surface.

Smith, U.S. Pat. No. 4,547,403, describes refractory compositions containing bulk fibers such as glass fibers, applied by spraying with a solution of high temperature resistant tacky binding material.

Vukasovich, U.S. Pat. No. 3,148,996, describes foamed ceramics made by reacting aluminum phosphate solution with calcium silicate to form a pasty product to which is added a gas or precursor therefor, such as fine particles of carbonate, followed by complete curing.

There is a need for a metallic coating or surface which may be applied and bonded to the surface of substrate structures, zone-confining panels, ceilings or walls, and the like, which coating can adhere indefinitely to the structures, be capable of facile application, especially brush or spray application, and cure or set up rapidly to a hard finish to provide good weather-proof, abrasion-resistant, reflective and/or electroconductive properties, an enhanced surface appearance, with patination if desired, and other desirable properties such as fireproofing or fire-resistant properties. The need for fireproofing is seen especially in areas where personnel are at risk in the event of a sudden fire where fire wall or heat differential protection is lacking for a sufficient time to enable the personnel to make a safe exit from the premises. There is a need for formed or molded dense-bonded conglomerate or monolithic structures that can be readily made and repaired by molding and can serve as tool pieces or dies for sheet metal forming or polymer resin injection molding.

It is therefore an object of the present invention to provide compositions for the bond-coating of substrate structures and means for their production which avoid the disadvantages of the prior art structures and processes.

It is also an object to provide dense-bonded conglomerate or monolithic structures having high early compressive strength and being useful as tool pieces or dies.

It is also an object of the invention to provide bonded surface-coated structures in any of a variety of architectural or decorative finishes, reflectivities, electronconductive formats, insulative and energy transfer qualities, fire resistant properties and the like.

It is another object of the invention to provide economical means for improving the thermal barrier efficiency of panel structures and the like as, for example, in furnaces, stoves, heaters, radiant heat panels, wall, floor and ceiling surfaces, building and room dividers, warehouse and storage spaces, heating and processing zones and the like.

It is still another object to provide means for the fast repair, retrofitting and/or construction of wear-resistant, insulative or fire-resistant surfaces, structures and the like, advantageously at ambient temperature.

These and other objects, features and advantages will be seen from the following detailed description of the invention.

SUMMARY OF THE INVENTION

We have discovered high early strength quick set curable metal particulate matrix compositions, structures and technology that are capable of wide practical application.

The invention in one preferred aspect concerns dry metal particulate matrix compositions (sometimes referred to hereinafter as dry metal compositions) for mixing with acidic phosphate binder solution (also known as activator solution) to obtain a workable self-curing metal particulate mixture for applying as fast set metallic cover or coating on the surface of a substrate structure. The matrix composition in one preferred embodiment contains by approximate weight percent, magnesium oxide, 5 to 10; and metal powder, 90 to 95. Another preferred embodiment contains magnesium oxide, 5 to 10; metal powder, 86 to 94; and metal fibers, 1 to 4. The metal powder preferably is a copper, bronze or stainless steel powder, or mixtures thereof. The metal fiber preferably is a stainless steel fiber. The uncured mixture of matrix composition and phosphate binder while fluid or workable is applied to the substrate in any suitable way such as brushing on or spraying with optional masking or stenciling, troweling, casting, molding or the like. In a preferred embodiment, the matrix and binder are applied by a gun, e.g. a mixing spray gun. They are fed separately to the gun and are applied as a mixture to the substrate. Preferably they are brought together and mixed while leaving the gun nozzle whereby the uncured gunned material is efficiently mixed and quickly applied as a mixture to the substrate (which may be a wall surface, mold cavity, or the like) to the desired layer thickness, shape or form and allowed to set-up or cure to a rigid self-bonded structure. The technology is therefore economical in that by these means extensive surfaces can, at relatively low cost, be covered with a durable rigid metal finish having advantages presently to be described.

The invention in another preferred aspect concerns a metal facing surface bonded to a substrate structure obtained by establishing a workable self-setting mixture of the above-mentioned metal matrix composition and the acidic phosphate binder, the quantity of acidic solution relative to the total mixture being sufficient prior to setting to impart lubricity to the mixture, working the mixture into a facing cover for the substrate structure, and allowing the thus worked facing cover to set into a rigid metallic facing surface bonded to the substrate. The materials can be selected to cure or set up slowly or quickly (e.g. with a set time of 20 minutes or more or a set time of 10 minutes or less), and in a preferred form the metal matrix composition is such that, in the desired thickness, it can be applied quickly (e.g. brushed on or sprayed on) to the substrate surface or predetermined portions thereof. The resulting metal surface when set and cured has an attractive appearance and is durable over long periods of use under widely varying environmental conditions.

The invention in still another preferred aspect concerns a bonded particulate monolithic structure or conglomerate structure. The structure is obtained by establishing a workable or plastic self-setting mixture of a dry particulate matrix composition and an acidic phosphate binder solution, working the plastic mixture, preferably by molding or casting, into a conglomerate shape, and allowing the thus worked shape to set into a dense rigid bonded particulate conglomerate structure or workpiece. The resulting structures have exceptionally high compressive strength. They can be produced economically and have wide application in manufacturing, industry, the fine and applied arts and in related fields. For example, it is found that the bonded conglomerate structures are relatively free of breakage and can be used as rigid forming tools and dies over a wide temperature range, for the manufacture of formed sheet metal parts and plastic resin articles. In the event of breakage or wear, the tool piece or die can be repaired at low cost by unskilled workers. A preferred dry particulate matrix composition for forming a bonded conglomerate structure is a blend comprising magnesium oxide and particulate aggregate material selected from fine metal powder, coarse ceramic particulates, and mixtures thereof. A preferred embodiment is a composition containing by approximate weight percent: magnesium oxide, 5 to 10%; and metal powder, 90 to 95%. Another preferred embodiment contains magnesium oxide, 5 to 10%; metal powder, 86 to 94%; and stainless steel fibers (e.g., ½ inch to 1 inch length sizes), 1 to 4%. Still another preferred embodiment is a composition containing by approximate weight percent: magnesium oxide, 5 to 10%, 40 to 100 screen; ceramic stone, coarse, 45 to 55% (ca. 8 to 10 screen); mullite, coarse to fine, 40 to 45% e.g. 48 to 200 screen.

The invention in yet another aspect concerns a bonded metallized electroconductive or cathodic structure obtained by establishing a workable self-setting mixture of the above-mentioned metal matrix composition and the acidic phosphate binder, working the mixture in a predetermined configuration onto the surface of a substrate that is non-conductive to the flow of electricity, and allowing the thus worked mixture to set into a rigid electroconductive configuration bonded to the non-conductive substrate. A preferred metal matrix composition for the purpose contains by approximate weight percent: magnesium oxide, 5 to 10%; metal (e.g. copper) powder, 90 to 94%; optionally with stainless steel fibers (e.g. ½ to 1 inch sizes), 1 to 4%.

The invention in another preferred aspect concerns a flame-resistant or fireproofing metal composition for mixing in dry form with liquid acidic phosphate binder solution to form a workable fast set, self-curing exothermic reaction mixture for bonding application in plural-layered or composite coated relation on a substrate structure such as a wall or solid support, such that the composition structure confers high thermal reflectivity to the substrate. In a preferred embodiment, the metal composition is a mixture in dry form containing powdered metal, preferably powdered metal platelets, magnesium oxide, activated alumina, and aggregate, preferably refractory aggregate and more preferably a refractory silicate or mullite aggregate or fine mullite ($-200$) aggregate. In a preferred embodiment the metal composition, in a blend of particulate components suitable for coating, brushing, troweling or spraying, contains by approximate weight percent, magnesium oxide, 6 to 15%; powdered metal (or metal powder, these terms being equivalent and used interchangeably herein), e.g. copper, bronze or stainless steel powder or mixtures thereof, 2 to 40%; refractory aggregate, e.g. refractory silicate which preferably is mullite, or a mullite-type silicate, 10 to 60%; and activated alumina, 10 to 40%. The powdered metal, preferably copper, bronze or stainless steel powder, is preferably in the form of flakes or platelets, i.e. 3-dimensional particulates in which one dimension is relatively thin or flat so that the particulates when worked onto a flat surface tend to plate out with flat orientation onto that flat surface. The platelets, it is found, tend to have greater reflectivity when coated and cured, according to the invention, in multiple layers than does a powdered metal composition which lacks metal platelets.

The invention in another aspect concerns a flame-resistant or fireproof construction that is a composite of layers bonded on a substrate structure such as a wall, bulkhead, solid support, and the like. The mentioned construction is obtained by applying successive cured layers (hereinafter sometimes referred to as a composite structure) of an uncured fast set self-curing exothermic reaction mixture on the surface of the substrate structure. When the composite structure is applied and bonded to the substrate as described, it is found that the outer layer of the composite structure advantageously is intumescable, i.e. swellable into gas-phase pockets or voids between the layers when the outer layer is flamed or exposed to high heat. If flamed, the thus flamed layer becomes swollen with voids between the outer layer and the adjacent inner layer and (because the voids confer low heat transfer properties to the resulting inner layer space) thereby typically provides heat differential protection across the layers. The protection typically is equivalent, e.g., to at lesat about 1600° to 2000° F. for ten minutes. The uncured reaction mixture is a high early strength fast set mixture of the above described fireproofing metal composition (containing metal powder, magnesium oxide, activated alumina, and refractory aggregate) with acidic phosphate binder solution. In this regard, the invention contemplates a composite fireproof construction where the outer layer and its inner layer, defined herein, may each contain metal powder in either platelet form or non-platelet form or as a mixture of platelet or non-platelet forms. Suitable metal powders for the purposes of the invention are commercially available, both in platelet form or non-platelet form, the former being preferred for the outer and inner layers.

The invention in another aspect concerns a method of flame-proofing or fireproofing a substrate structure such as a wall, bulkhead, solid support, and the like. The method comprises applying successive cured layers each of suitable thickness, e.g. at least two layers preferably each being about 10 to 20 mils thick, of an uncured fast set self-curing exothermic reaction mixture on the surface of the substrate structure that is to be protected. As indicated, each layer contains metal powder preferably in the form of flakes or platelets which it is found tend to plate out with flat orientation upon a flat substrate surface. As a feature of the invention, it is found that following curing, the outer layer is intumescable so that, e.g., if flamed whether by accident or by intention, the thus flamed layer becomes swollen with consequent thermallyinduced generation of void spaces between it and the next, inner layer, and typically provides useful fire wall or heat differential protection. The protection across the layers to be described presently, is equivalent to at least about 1650° to 2000° F. for ten minutes or more. It is found that two such composite fireproofing layers, i.e. an outer layer and an inner layer, having a total thickness of about 20 to 40 mils, preferably 20 to 25 mils, are sufficient to provide an adequate thermal barrier for purposes of fireproofing. The invention contemplates the use of more than two layers in which the outer layer is intumescable and the next, contiguous layer is regarded as the inner layer between which outer layer and its inner layer voids are formed when the outer layer is flamed. The uncured reaction mixture employed is workable for layering by suitable means preferably by spraying, brushing, molding, troweling or the like, comprising acidic phosphate binder solution (or an equivalent acidic binder) and a metal composition as described above preferably containing activated magnesium oxide, powdered metal preferably as metal platelets, refractory silicate preferably mullite, and activated alumina.

The magnesium oxide of the embodiments described herein is activated or calcined magnesia. The magnesia analysis (by weight) may be MgO 87.3%, $SiO_2$ 4.6%, $Fe_2O_3$ 2.7%, $Al_2O_3$ 1.2% and CaO 1.2%, or preferably of higher purity e.g. 97% MgO.

The bulk density of the magnesia can be 480–4000 e.g. 800–2400 and especially 800–1600 kg/m$^3$ (30–250 lb/cu.ft., e.g. 50–150 and especially 50–100 lb/cu.ft.) and its surface area 5–200 m$^2$/g, preferably 5–150 or 5–50 m$^2$/g such as 5–20 m$^2$/g. The particle size of the magnesia may be such that at least 50% passes through a 325 mesh screen with at least 90% passing through a 200 mesh screen, but preferably the magnesia is of very fine particle size with at least 90%, especially at least 95% passing through a 325 mesh screen and not more than 5%, especially not more than 2% retained by a 200 mesh screen. Increasing the surface area (i.e., reducing the particle size) of the magnesia increases its activity and shortens the reaction time with the phosphate binder, and hence decreases the cure time of the final composition.

The metal powders employed in the dry metal compositions of the invention are available in a flake or platelet form or in a non-platelet form from commercial sources, e.g. Obron Co., Painesville, OH, or Greenback Industries, Inc., Greenback, TN. The platelet or flake form is preferred for applications calling for high specular gloss or high sparkle. A typical analysis of the non-platelet form (e.g. as copper powder or bronze powder) Greenback Industries, Inc., Greenback, Tenn.) is as follows:

| Copper, ca. 99.6% | Bronze, ca 89% Cu. 10.5% Sn |
|---|---|
| Apparent Density (g/cc): 2.5 | 5.2 |
| Approximate Screen: | |
| −100 + 150 9.5% | — |
| −150 + 200 20 | 6.5% |
| −200 + 250 8.5 | 6 |
| −250 + 325 13 | 13.5 |
| −325 49 | 74 |

A typical analysis of flake-containing or platelet-containing powder is a bronze powder having a high sparkle appearance, 50% leafing value, rated at 2,500 square cm. per gram water coverage, bulk density 0.8 kg. per liter, and good leafing stability.

The refractory aggregate for the metal fireproof composition of the invention preferably is a crystalline refractory alumino-silicate material such as an olivine mineral or a mullite-type material (e.g. 3 $Al_2O_3$-2 $SiO_2$). the mullite may be a naturally occurring mullite or artificially made, e.g. by heating a mullite ore such as andalusite, sillimanite, or Kyanite. The particle size of the aggregate is not critical and may range from large particulates that can be applied in a layer to very fine particulates. In one preferred embodiment, the particle size distribution of the aggregate is such that the dry metal composition containing the aggregate can be mixed, preferably by a gun, with the acidic phosphate solution, and the mixture can be sprayed in an uncured layer of desired thickness, e.g. ea. 10 to 20 mils thick or more, onto the substrate surface and allowed to cure. In other words, the particle size is such that the laid-down layer is even and the aggregate particles can fit within the layer. Spraying is prepared, as opposed to other methods of application, because the applied layer is more even, and the layer thickness is easier to control. A preferred mullite is one having particle sizes at least 50% of which pass through a 325 mesh screen and at least 95% of which pass through a 200 mesh screen. Preferred commercial aggregates are relatively coarse mullite, e.g. mullite 48, fine mullite e.g. mullite 200, mixtures thereof, and equivalent aggregates, especially mixtures containing enough coarse or large particle aggregate, e.g. mullite 48 to thicken the gun mixture and make it easier to spray.

The activated alumina preferably is a calcined alumina with typical analysis by weight of 99.8% $Al_2O_3$, 0.13% $Na_2O$, 0.03% $Fe_2O_3$ and 0.03% $SiO_2$. One function of the alumina is to make the exothermic reaction mixture sticky and give it body. A sufficient amount for this purpose can readily be determined by routine experimentation. The particle size is usually such that at least 50% passes through a 325 mesh screen and at least 90% through a 200 mesh screen and preferably at least 90%, e.g. at least 95 passes through a 325 mesh screen. The bulk density of the alumina may be 480-1600 kg/m³ e.g. 960-1280 kg/m³ (30-100 lb/cu.ft., e.g. 60-80 lb/cu.ft.) and its surface area 10-200 m²/g, e.g. 50-100 m²/g.

The acidic binder is an acidic solution of monoaluminum dihydrogen phosphate (MALP or MAP) which may contain phosphoric acid. Suitable binders are commercially available as a packaged or bulk commodity; waste or by-product phosphoric acid can also be used. The commercial acidic solution may contain 10-60% by weight of the phosphate salt. The solution usually has a pH of 0.5-2.0 due to the presence of an excess of phosphoric acid over that necessary to fully react with the metal or metals present in it. Typical commercial MAP solutions (about 50% by weight total salts) contain 7.8-8.2% $Al_2O_3$ (or 7.0% $Al_2O_3$ and 0.67% MgO) and 33.4-34.0% $P_2O_5$ with a weight ratio of $P_2O_5:Al_2O_3$ of about 4:1 (a molar ratio of P:Al of 3.03:1), (or a molar ratio of P to Al+Mg of 3.07:1), have a specific gravity (26.7° C./15.6° C., 80° F./60° F.) of 1.47−1.50, and a pH as shipped of about 1.0. Preferably the strong commercial aluminum phosphate solutions are diluted with water before mixing with the other ingredients, i.e. the dry metal composition, e.g. one part by weight of the MAP solution is diluted with 0.5-4 parts by weight of water; thus the concentration of MAP solution used to mix with the other ingredients is preferably 10-35% by weight, especially 15-30% such as 20-25% by weight. The concentration of the phosphate solution should be such that the mixture with the other ingredients should be capable of working and in preferred embodiments capable of being sprayed. The amount of water added separately or with one of the ingredients in order to make the final curable composition, when mixed but before curing is complete, is usually 10-50% such as 10-40% by weight, such as 20-40% e.g. 20-35% such as 22-32% 25-35% by weight or 35-50% of the total weight of all the ingredients used to make the curable composition including the water. The content of the aluminum phosphate in the curable composition is preferably 20 to 30% weight on a dry basis.

The acidic phosphate binder solution may contain a surface active agent e.g. a nonionic, anionic or cationic surfactant. The surface active agent is used in an amount sufficient to prevent foaming, e.g. 0.1-5% by weight of the binder solution. The surfactant is mixed with the acidic phosphate binder solution before mixing with the dry metal composition or particulate body.

The curable compositions of the invention are made by thoroughly mixing the ingredients. With compositions of low cure rate, e.g. with a set time of 20 minutes or more, the dry metal composition and binder solution may be mixed first, e.g. in a low shear mixer and then applied, e.g., by troweling onto the surface to be treated or molded into the desired shape. With compositions of high cure rate, e.g. with a set time of 10 minutes or less, this process may give problems of premature setting so that it is preferred to apply the composition quickly onto the surface, e.g. as by spraying or gunning the mixture. The reacting components, i.e. the dry metal composition and acidic phosphate solution suitably can be kept separate and supplied under pressure to the nozzle of a gun where the compounds are mixed at or near the nozzle of the gun, such that the components exit from the gun nozzle as an unset curable mixture. The gun ejects the mixture as a spray onto the substrate surface to be coated using a pressure of, e.g. up to 105,000 e.g. 3500-105,000, 3500-14,000 such as about 7000 kg/m² gas (up to 150, e.g. 5-150, e.g. 5-20 such as about 10 psi), e.g. air pressure. Pressure applied spray mixing is preferred. Equipment for mixing and supplying the dry metal composition to the spray nozzle may be conventional, one such unit being available from RFI Construction Products, Inc., Farmingdale, N.Y. Preferably the magnesium oxide is premixed thoroughly with the metal powder and then the combined dry composition is mixed with the acidic phosphate solution by means of the gun under nozzle mix conditions just at the point of discharge of the wet material from the gun and the mixture is sprayed. The particles of aggregate composition are carried through the gun nozzle with the air stream and then the acidic phosphate solution supplied under pressure from an independent source is introduced via suitable means e.g. nozzle orifices into the stream of particles to form a wet material containing about 10-50% such as 10-30%, e.g. 15-25% water (based on the total weight of material). The ratio of the volume of the aggregate composition e.g. of density 30-50 pcf, to the aqueous phosphate solution is usually 10-2:1 e.g. 5-2:1. The spray gun may be a conventional dry nozzle mix gun. The production of the dry metal composition may be performed in a factory with the mixture being shipped to the site of use of the curable composition, e.g. a building site, dry dock, or another factory where the mixture is to be mixed with the acidic phosphate solution and used to cover or coat the substrate surface being treated.

Compositions according to the invention may be applied to any rigid substrate, especially building components, walls, ceilings, floors, ductwork, panels, pipes, ceramic articles, jewelry forms, electronic component substrates, artware forms, nonelectroconductive substrates, and the like. The compositions can be applied and strong-bonded to steel and other structural materials, such as aluminum and other non-ferrous metals, concrete, wood, plastic, and glass. The coating on the substrate in its dried and set state can be of any desired thickness and suitable may be a thin coating overall usually about 20 to 40 mils or more, preferably 20 to 25 mils for a 2-layer coating, and 5 to 25 mils or more, preferably 10 to 15 mils for a single layer coating.

The compositions may be applied as an overall cover or coating for a surface to give it a bright metal finish or a highly wear-resistant and durable finish. The compositions also may be applied to only a predetermined position or portions of the surface, e.g. as a design or as a suitably applied or printed electroconductive circuit. The surface of the cured coating may be a smooth finish, a mirror finish, a matte finish, an oxide finish, if necessary produced by polishing, electrofinishing, or the like.

Because the setting reaction is exothermic and setting will occur at 38°-82° C. (100°-180° F.), no heat is needed for cure over a range of temperature down to about −8.3° C., (17° F.). By varying the amounts of magnesia and MAP and the degree of subdivision of the magnesia, setting times can be varied from almost instantaneous to whatever is desired, say 4–60 minutes, e.g. 35–60 minutes or 4–11, e.g. 9 or 10 minutes. The uncured coating is usually continuous and free from breaks or separation and tends to adhere to itself and to the substrate long enough to enable the chemical phosphate bonding to set the coating and adhere itself to the substrate. This adhesion of the uncured coating to the substrate can apply also to vertical and overhead substrate as well.

The curing speed and strength of the cured product depend on the amount of the magnesium oxide relative to the phosphate content of the acidic binder solution and to the free phosphoric acid content of the binder solution. In general, increasing the amount of magnesium oxide and/or increasing the free acid content increases the cure rate. Increasing the surface area (i.e. subdividing or decreasing the particle size of the magnesium oxide) also increases the cure rate. The weight ratio of MgO to $P_2O_5$ in the acidic binder solution may be 0.2–10:1, e.g. 0.2–3:1 or 0.5–10:1 e.g. 1–5:1 or 0.5–3:1.

BRIEF DESCRIPTION OF THE DRAWINGS

The invention will be more fully understood by reference to the accompanying drawings in which.

Figure 1:
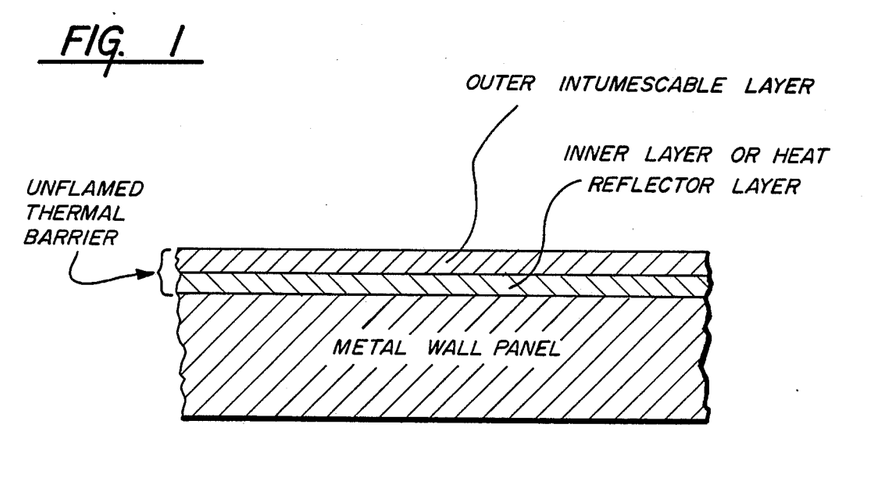
FIG. 1 is a schematic view of a substrate structure or wall panel protected by composite inner and outer fireproofing or thermal barrier layers according to a preferred embodiment of the invention.
Figure 2:
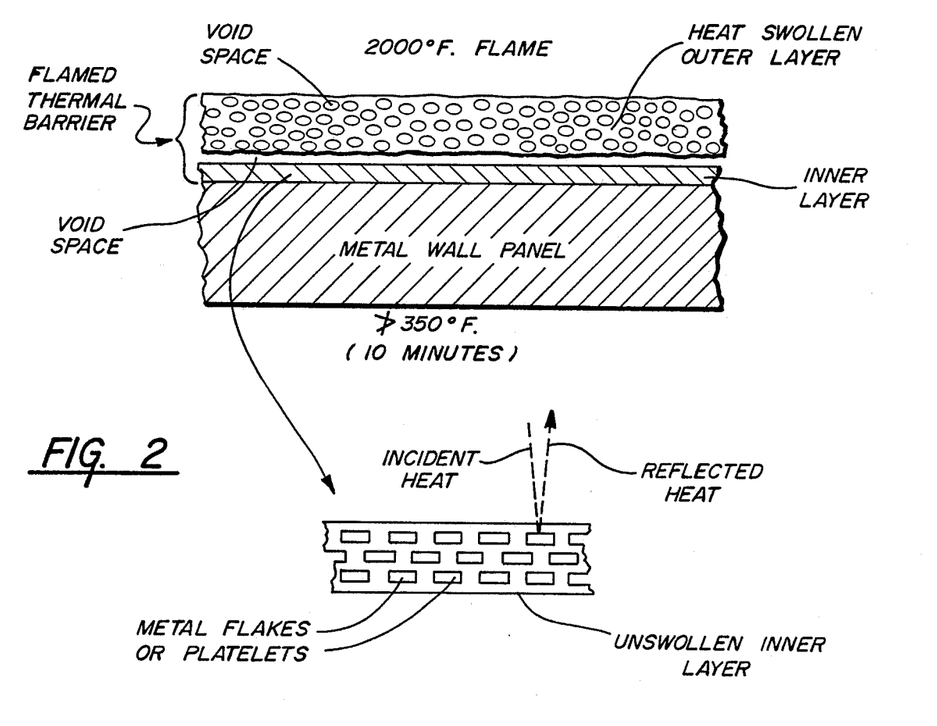
FIG. 2 is a similar view showing the swollen condition of the outer layer, according to a preferred embodiment of the invention, after having been exposed to fire equivalent to flaming at 2000° F. for ten minutes, affording heat differential protection of about 1650° F. between the coated and uncoated sides of the wall panel.

Referring to the drawings, a fireproof construction is shown (FIGS. 1 and 2, schematic, segmented) comprising a metal wall panel or substrate structure, e.g. aluminum sheet, thickness ¼ inch, to which is bonded separate inner and outer layers covering or coating the panel. The layers each contain heat reflective metal particles preferably as flakes or platelets thus serving as a thermal barrier or fire shield. It is found surprisingly that when the outer layer is flamed at high temperature (e.g. 2000° C.), the inner layer remains intact, and the outer layer swells, fills itself with void space or cavities, and to an extent it delaminates from the inner layer and randomly leaves discontinuous void spaces between the inner layer and the outer layer.

Figure 3:
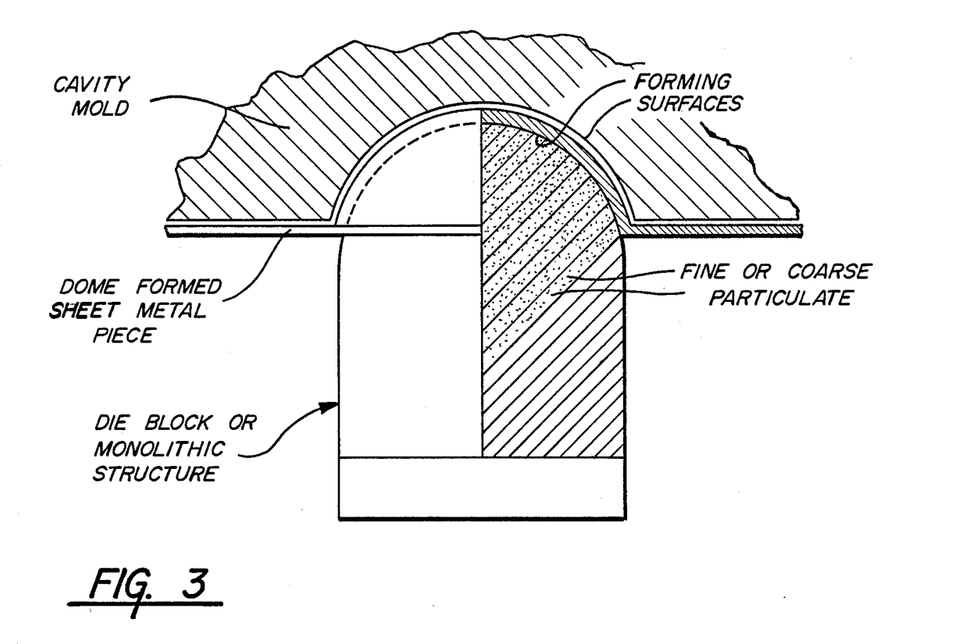
FIG. 3 is a view in elevation of a cylindrical dome-ended monolithic structure or die block according to a preferred embodiment of the invention, for the manufacture of formed sheet metal parts, cut away on a quadrant to show the close conformation of its hemispherical forming surface with a sheet metal piece formed by stamping from flat sheet stock into a matching cavity mold shown in fragmented section.

As shown in FIG. 3, the invention in one preferred aspect concerns a monolithic structure exemplified by a highly dense 3-dimensionally formed tool piece or die block having exceptional compressive strength and long service life. The die block can be use, e.g., for forming complex curvilinear shapes, dome shapes, and the like, by stamping flat stock or sheet pieces. The die block has a long service life and if worn or damaged, can be readily repaired by recasting or molding to the original die mold specification.

Figure 4:
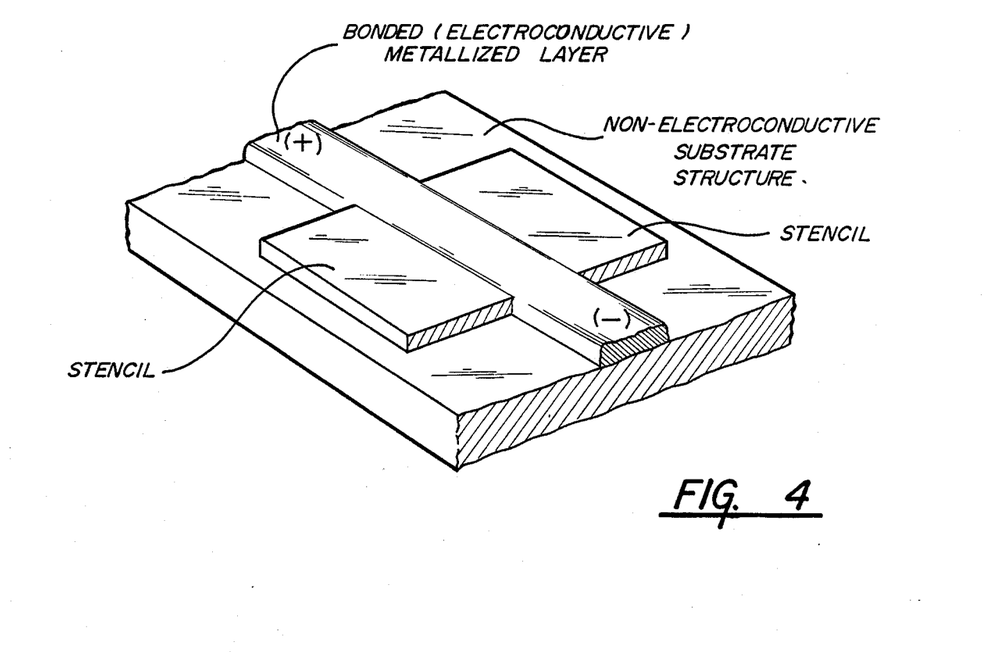
FIG. 4 is a fragmented perspective view of a non-electroconductive building panel or substrate structure to which an electroconductive metallized layer is stencil-and-spray applied and bonded according to a preferred embodiment of the invention.

As shown in FIG. 4, the invention includes a bonded metallized structure comprising a substrate structure, e.g. a wall panel, and a metal facing surface structure or metallized layer bonded to the surface of the substrate structure. The metal facing or layer is applied to a portion or all of the surface of the substrate in any suitable manner, e.g. by brushing or spraying optionally with a stencil as shown. The metal layer can be used as an electroconductive layer e.g. as a cathodic layer, as an element of an electric circuit, or the like.

The invention will be further illustrated by the following specific examples, which are given for illustration only and are not intended as limiting the invention beyond the scope of the appended claims.

In the specification including Examples, parts and percentages are by weight unless otherwise specified, and screen sizes are determined according to the U.S. Standard Sieve size tests. In the Examples the products used, namely, magnesia and monoaluminum phosphate solution, have the following characteristics. The magnesia may be a very fine particle product of which at least 90% passes through a 325 mesh screen and which has a surface area of 10 $m^2/g$ and a density of 1200 $kg/m^3$ (75 lb/cu.ft); the magnesia also may be a fine particle product of which at least 90% passes through a 200 mesh screen and has a surface area of 30–40 $m^2/g$.

EXAMPLE 1

Metallizing and/or Fireproofing Composition; Fireproofing (a) a dry blended metal composition or mixtue is prepared using the following components:

|  | wt % |
| --- | --- |
| magnesium oxide, 10-325 | 10 |
| copper metal powder (platelets, 60 to 100 screen Obron, Inc., Painesville, OH). | 40 |
| mullite 200 | 40 |
| calcined (C-3), alumina | 10 |

The resulting mixture is suitable as an article of commerce for supply to the trade to be mixed with acid binder (activator) solution at the site of use for preparation of an uncured coating mixture that can be applied for fireproofing in separate curable layers to the exposed surface of a substrate structure such as a wall, column, beam, pipe or the like.

(b) For the preparation of a coating mixture, the metal composition of paragraph (a) is mixed with 38% by weight of monoaluminum acid phosphate solution, 50% strength. The resulting mixture is an exothermic reaction mixture. When applied wet (e.g. by brushing or spraying) as a thin metallized covering layer on a substrate surface e.g. a concrete wall panel, it typically has a set time of 6 minutes and a cure time at room temperature of one day; the compressive strength of the cured layer is about 6175 psi. The resulting metallized surface has good specular gloss and an aesthetically pleasing and decorative appearance.

(c) For the preparation of a flame-resistant or fireproof construction exemplified by a barrier-coated metal plate or panel, the uncured wet mixture is applied or covered uniformly by brushing in two separate layers (e.g. total two-layer thickness, 25 mils) to one side of the (metal plate aluminum, thickness one-eighth inch). The layers are each allowed successively to set and cure. The resulting fireproof composite structure is durable and has good flame resistant properties. For example, when the outer layer is flamed at 2000° F., the inner layer typically remains intact, and the outer layer is caused to swell or intumesce so that spaced apart bubbles, cellular spaces or voids slowly develop between the outer and inner layers. The resulting composite structure which is a self-formed discontinuous cellular structure thus serves as a fire wall, typically giving heat differential protection across the layers equivalent to at least about 1650° F. for 10 minutes (the end point temperature on opposite sides of the plate being 2000° F. on the flamed side and not more than 350° F. on the other side). This delay in heat transfer from the flamed side of the metal plate to its opposite side provides a safety measure, for example, for pesonnel or occupants of a firewall protected space in a case where the delay time is sufficient added time to eanble their safe exit from the space.

EXAMPLE 2

Formula Variation: Metallizing and/or Fireproofing Composition; Fireproofing

The procedures of Examples (1a), (1b) and (1c) are carried out as described but the proportions of the components are varied within the following approximate limits:

|  | Wt. % |
| --- | --- |
| Dry Mixture |  |
| MgO, 10-325 | 8 to 15 |
| powdered metal, platelets (copper or bronze) | 5 to 40 |
| mullite 200 | 10 to 40 |
| calcined C-3 aluminum | 10 to 40 |
| Acidic Activator Solution |  |
| monoaluminum phosphate, 50% solution | 80 to 120 (based on dry mixture) |

An optional dry mixture that is preferred for giving the spray mixture more body is the above dry mixture where the mullite is present as coarse mullite e.g., mullite 48 (5 to 10%) and fine mullite, e.g. mullite 200 (30 to 35%).

EXAMPLE 3

Metallizing/Fireproofing - Low Ratio Metal-to-Refractory Aggregate

The procedures of Examples (1a), (1b) and (1c) are carried out as described but the proportions of the components may vary within the following approxiamte limits:

|  | Wt. % |
| --- | --- |
| Dry Mixture |  |
| MgO, 10-325 | 6 to 12 |
| powdered metal, platelets (copper or bronze) | 2 to 10 |
| mullite 200 | 30 to 60 |
| calcined C-3 alumina | 20 to 40 |
| Acidic Activator Solution |  |
| monoaluminum phosphate, 50% solution | 80 to 120 (based on dry mixture) |

EXAMPLE 4

Metal Coated Concrete Building Panel (a) A metal matrix composition is prepared as a weight percent blend containing about 5 to 15% magnesium oxide, bulk density, 10 to 40 lb. per cubic foot, and about 85 to 95% copper powdered metal, optionally with 1 to 3% stainless steel fibers (size range, ½ to 1 inch). The resulting dry mixture, when packaged, can be used as an article of commerce for mixture on the coating job site with activator solution preferably 20 to 30% by weight of acidic binding solution, viz. monoaluminum hydrogen phosphate (about 50% total salts; MALP 50) activator solution optionally containing ½ to 5% by weight surfactant.

(b) The dry and wet components of paragraph 4a are set up for spray gun application; and a flat surface, dry concrete building panel is coated with a sprayed mixture of the dry and wet components to give a uniform coating of (having a density of ca. 160 pcf) of desired thickness, e.g. ea. 20 mils. The resulting coated panel sets up hard in about ten minutes and has an overall copper metal finish without breaks. The finish is abrasion-resistant and smooth to the touch. The finish typically is highly reflective and can be polished, e.g. with jewelers rouge, to give a mirror-like finish. The finish can be protected from corrosion by film coating with clear lacquer or other protective clear coating. Optionally, the copper finish can be allowed to weather and to become aged or oxidized so that it has an oxide patina. Also, the patina can be achieved by treating the finish artificially with an oxidizing agent or dilute acid (e.g. sulfuric acid) to form a copper sulfate blue/green finish.

(c) The same procedure of paragraphs 4a and 4b to obtain a bronze finish or a stainless steel finish on the building panel can be carried out by substituting bronze powdered metal or stainless steel powdered metal respectively for the copper powdered metal.

EXAMPLE 5

Bonded Conglomerate Structure or Die Block (a) A metal matrix composition is prepared which is a blend, by approximate weight percent of bronze powdered metal, 40 to 50%; stainless powdered metal, 40 to 50%; and magnesium oxide (10-325), 5 to 10%; optionally with stainless steel fibers, e.g. 1 to 4%. The resulting dry mixture when packaged, can be used as an article of commerce for mixture on the job site with activator solution, e.g., 25% by weight MALP 50 solution optionally containing surfactant (e.g. ½ to 5%).

(b) The dry and wet components of paragraph 5a are well mixed, and the mixture is cast in the form of a die block. The curing time at room temperature for full set is about one hour and for complete cure about two days. The resulting die block typically has high compressive strength (e.g. ea. 6,500 psi) and can be used by stamping, thermoforming, etc., to form parts out of various materials such as sheet steel and aluminum, thermoplastic resins, and the like.

(c) In another preferred embodimet, the dry and wet components of paragraphs 5a and 5b can be replaced respectively with a metal matrix composition which is a blend of stainless steel powdered metal, 90 to 95%; MgO 10-325, 5 to 10%; and optionally stainless steel fibers, 1 to 4%; and with 20 to 30% by weight of activator solution MALP 50 optionally with ½ to 5% surfactant.

EXAMPLE 6

Bonded Conglomerate Structure or Die Block (a) A ceramic matrix composition is prepared containing a blend of 50% coarse ceramic stone (ea. 8 to 16 screen, spark plug insulator chips), 30% mullite 200, 10% mullite 48 and 10% magnesium oxide 10-40. The resulting dry mixture, when packaged, can be used as an article of commerce for blendinng in the shop or on the job site with activator solution, e.g., 25% by weight MALP 50 solution optionally containing ea. ½ to 5% surfactant.

(b) The dry and wet components of paragraphs 6a are well mixed, and the mixture is cast in the form of a die block. The curing time at room temperature for full set is about one hour and for complete cure about two days. The resulting die block typically has high compressive strength (e.g. ea. 6,500 psi) and can be used by stamping, thermoforming, etc., to form parts out of various materials such as sheet steel and aluminum, thermoplastic resins, and the like.

(c) In another preferred embodiment, the dry and wet components of paragraphs 6a and 6b can be replaced respectively with a ceramic matrix composition which is a blend of 40 to 50% coarse ceramic stone (ca 8 to 16 screen) 5 to 10% MgO 10-40, 40 to 50% mullite 200; optionally with 1 to 4% stainless steel fibers; and with 20 to 30% by weight of activator solution MALP 50 optionally with ½ to 5% surfactant.

The embodiments of the invention in which are exclusive property or privilege is claimed are defined as follows:

I claim:

1. A fire-resistant or fireproofing metal composition for mixing in dry form with liquid acidic phosphate binder solution to form a workable fast set self-curing exothermic reaction mixture for bonding application in plural-layered or composite coated relation on a substrate structure such as a wall or solid support, the metal composition being a mixture of particulates in dry form containing by approximate weight per cent magnetism oxide, 6 to 15%; metal powder, 2 to 40%; refractory aggregate, 10 to 60%; and activated alumina, 10 to 40%.

2. A composition according to claim 1 where the metal powder comprises metal selected from copper, bronze, stainless steel or a mixture of two or more of said metals.

3. A composition according to claim 1 where the metal powder comprises metal flakes or platelets.

4. A fire-resistant or fireproofing metal composition according to claim 1, the metal composition being mixed with liquid acidic phosphate binder solution as a workable uncured fast set self-curing exothermic reaction mixture suitable for bonding application in plural-layered or composite coating relation on a substrate structure.

5. A dry metal particulate matrix composition for mixing the acidic phosphate binder solution to obtain a workable self-curing metal particulate mixture to be applied and bonded as a fast set metallic cover or coating on the surface of a substrate or building structure such as a wall or solid support, which composition by approximate weight percent comprises magnesium oxide, 5 to 10% and metal powder, 90 to 95%.

6. A dry metal particulate matrix composition according to claim 5 containing about 1 to 3% stainless steel fibers.

7. A matrix composition according to claim 13 where the metal powder comprises metal selected from copper, bronze, stainless steel or a mixture of two or more of said metals.

8. A matrix composition according to claim 5 where the metal powder comprises metal flakes or platelets.

9. A dry particulate matrix composition for mixing with acidic phosphate binder solution to obtain a workable self-curing exothermically reactive mixture, forming the mixture, and allowing the formed mixture to set and cure into a monolithic or conglomerate structure, which composition by approximate weight percent comprises: magnesium oxide, 5 to 10%; and particulate aggregate material, 90 to 95%, selected from fine metal powder, coarse ceramic particulates, and fine and coarse refractory particulates, and mixtures thereof.

10. A matrix composition according to claim 9 where the aggregate material comprises coarse ceramic particulates and fine and coarse refractory particulates.

* * * * *

UNITED STATES PATENT AND TRADEMARK OFFICE
CERTIFICATE OF CORRECTION

PATENT NO. : 4,826,534

DATED : May 2, 1989

INVENTOR(S) : Shubow

It is certified that error appears in the above-identified patent and that said Letters Patent is hereby corrected as shown below:

On the face of the patent under U.S. PATENT DOCUMENTS Patent No. "2,610,420" should be --2,610,920--.

Column 1, line 51, "3,285,578" should be --3,285,758--.

Column 4, line 29, "composition" should be --composite--.

Column 5, line 37, "thermallyinduced" should be --thermally-induced--.

Column 5, line 63, "$Fe_2O_3$2.7%" should be --$Fe_2O_3$ 2.7%--.

Column 6, line 57, "prepared" should be --preferred--.

Column 11, line 23, "eanble" should be --enable--.

Column 11, line 57, "approxiamte" should be --approximate--.

Column 14, line 27, "claim 13" should be --claim 5--.

Signed and Sealed this

Twenty-third Day of January, 1990

*Attest:*

JEFFREY M. SAMUELS

*Attesting Officer*     *Acting Commissioner of Patents and Trademarks*